(12) United States Patent
Holten et al.

(10) Patent No.: US 10,610,044 B2
(45) Date of Patent: Apr. 7, 2020

(54) PROCESSING UNIT, SYSTEM COMRISING A CONSUMABLE AND USE OF A CONSUMABLE

(71) Applicant: KONINKLIJKE PHILIPS N.V., Eindhoven (NL)

(72) Inventors: Hendrikus Lodewijk Joseph Franciscus Holten, Eindhoven (NL); Jarno Beekman, Eindhoven (NL); Rodin Enne Bruinsma, Eindhoven (NL); Peter Rijskamp, Eindhoven (NL); Jan Klaassen, Eindhoven (NL); Peng Chau Quah, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 320 days.

(21) Appl. No.: 15/529,576
(22) PCT Filed: Dec. 14, 2015
(86) PCT No.: PCT/EP2015/079597
§ 371 (c)(1),
(2) Date: May 25, 2017
(87) PCT Pub. No.: WO2016/096730
PCT Pub. Date: Jun. 23, 2016

(65) Prior Publication Data
US 2017/0325619 A1    Nov. 16, 2017

(30) Foreign Application Priority Data

Dec. 19, 2014  (EP) ..................................... 14199114

(51) Int. Cl.
*A47J 31/36* (2006.01)
*A47J 31/06* (2006.01)
(52) U.S. Cl.
CPC ....... *A47J 31/3628* (2013.01); *A47J 31/0673* (2013.01); *A47J 31/3633* (2013.01); *A47J 31/3623* (2013.01); *A47J 31/3695* (2013.01)

(58) Field of Classification Search
CPC ................ A47J 31/3628; A47J 31/3695; A47J 31/0673; A47J 31/3623

(Continued)

(56) References Cited

U.S. PATENT DOCUMENTS 3,260,190 A    7/1966  Levinson
5,133,983 A *  7/1992  Greiwe ............... A47J 31/3614
                                                        210/247
(Continued)

FOREIGN PATENT DOCUMENTS

CN    1976614 A    6/2007
CN    101111179 A  1/2008
(Continued)

OTHER PUBLICATIONS

English Translation and Notice of Allowance issued in connection with corresponding application No. 2017-531834 dated Dec. 28, 2017, 5 pages.

(Continued)

*Primary Examiner* — Reginald Alexander
(74) *Attorney, Agent, or Firm* — Schott, P.C.

(57) ABSTRACT

The present disclosure relates to a processing unit (14) for a dispenser (10) for preparation of foodstuff products, comprising a receiving cavity (17) for receiving a consumable (30), the receiving cavity (17) comprising at least a first receiving portion (18) and at least a first fastening portion (20), a sealing unit (22) arranged to contact, at an inlet side (28), a first end (78) of the consumable (30), a primary inlet engagement unit (46) that is coupled to an inlet conduit (44), wherein the primary inlet engagement unit (46) is operable to engage the inlet portion (140) of the consumable (30) to process a foodstuff product in the consumable (30), an outlet engagement arrangement (48) comprising a primary outlet engagement unit (50) that engages a primary outlet portion (142) of the consumable (30) and an auxiliary outlet engagement unit (52) that engages an auxiliary outlet portion (144) of the consumable (30) at the outlet side (29), and a control unit (58) that is coupled to the auxiliary outlet engagement unit (52), wherein the control unit (58) is operable to control the auxiliary outlet engagement unit (52) such that the (Continued)

primary outlet engagement unit (50) and the auxiliary outlet engagement unit (52) engage the consumable (30) in a time-displaced manner, The disclosure further relates to a foodstuff preparation system and to a use of a consumable (30) in a dispensing appliance (10).

15 Claims, 6 Drawing Sheets

(58) Field of Classification Search
 USPC ........................................ 99/295, 323, 302 P
 See application file for complete search history.

(56) References Cited

U.S. PATENT DOCUMENTS

| | | | |
|---|---|---|---|
| 6,758,130 B2 | 7/2004 | Sargent | |
| 7,318,372 B2* | 1/2008 | Cooke | A47J 31/3628 |
| | | | 99/284 |
| 2015/0245733 A1* | 9/2015 | Castellani | A47J 31/0673 |
| | | | 426/112 |
| 2015/0246768 A1* | 9/2015 | Talon | A47J 31/0668 |
| | | | 426/79 |

FOREIGN PATENT DOCUMENTS

| | | |
|---|---|---|
| CN | 102613898 A | 8/2012 |
| CN | 103271654 A | 9/2013 |
| EP | 1704803 A1 | 9/2006 |
| EP | 2210826 A1 | 7/2010 |
| EP | 2543291 A1 | 1/2013 |
| JP | 2013-507211 A | 3/2013 |
| JP | 2013-538663 A | 10/2013 |
| WO | 2008046740 A1 | 4/2008 |
| WO | 2011010338 A2 | 1/2011 |
| WO | 2011045175 A1 | 4/2011 |
| WO | 2011077349 A2 | 6/2011 |
| WO | 2011153272 A2 | 12/2011 |
| WO | 2012100976 A1 | 8/2012 |
| WO | 2013/192625 A1 | 12/2013 |
| WO | 2014057094 A1 | 4/2014 |

OTHER PUBLICATIONS

English Translation and Office Action issued in connection with corresponding application No. 201580069570.9 dated Jan. 28, 2019, 9 pages.

\* cited by examiner

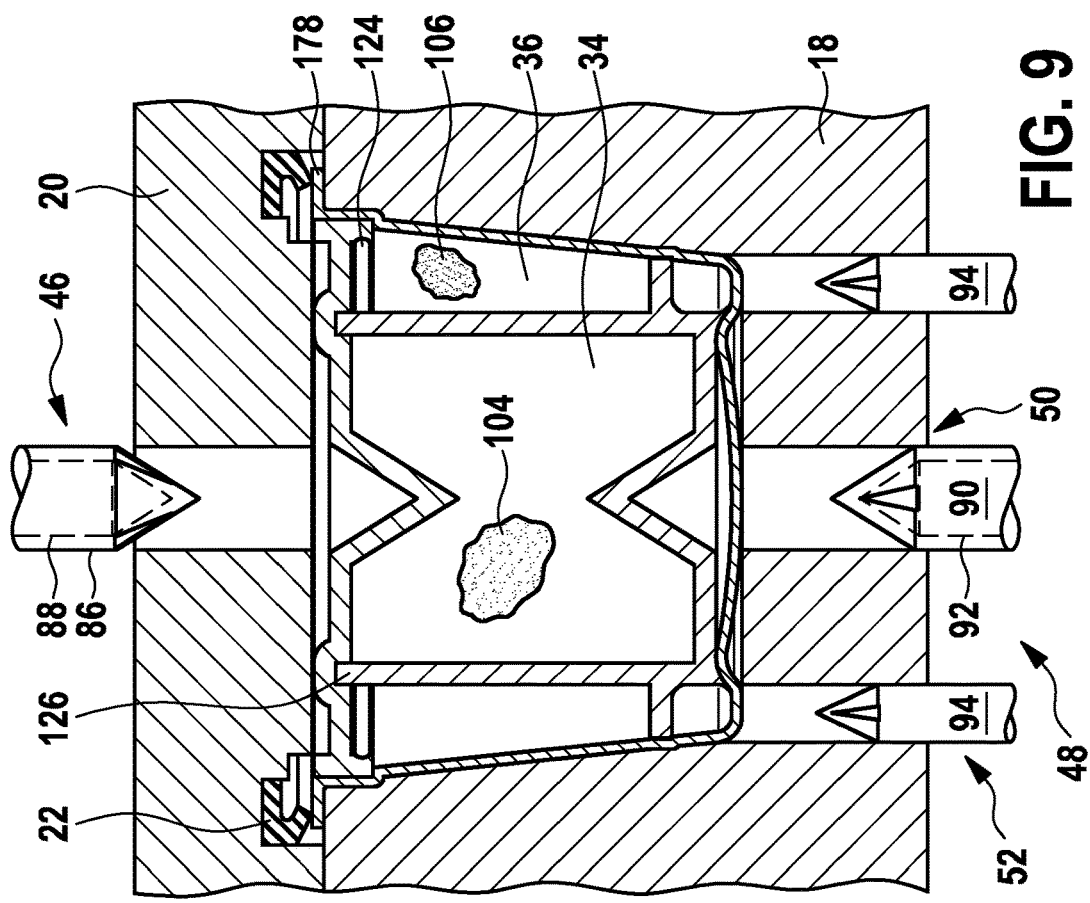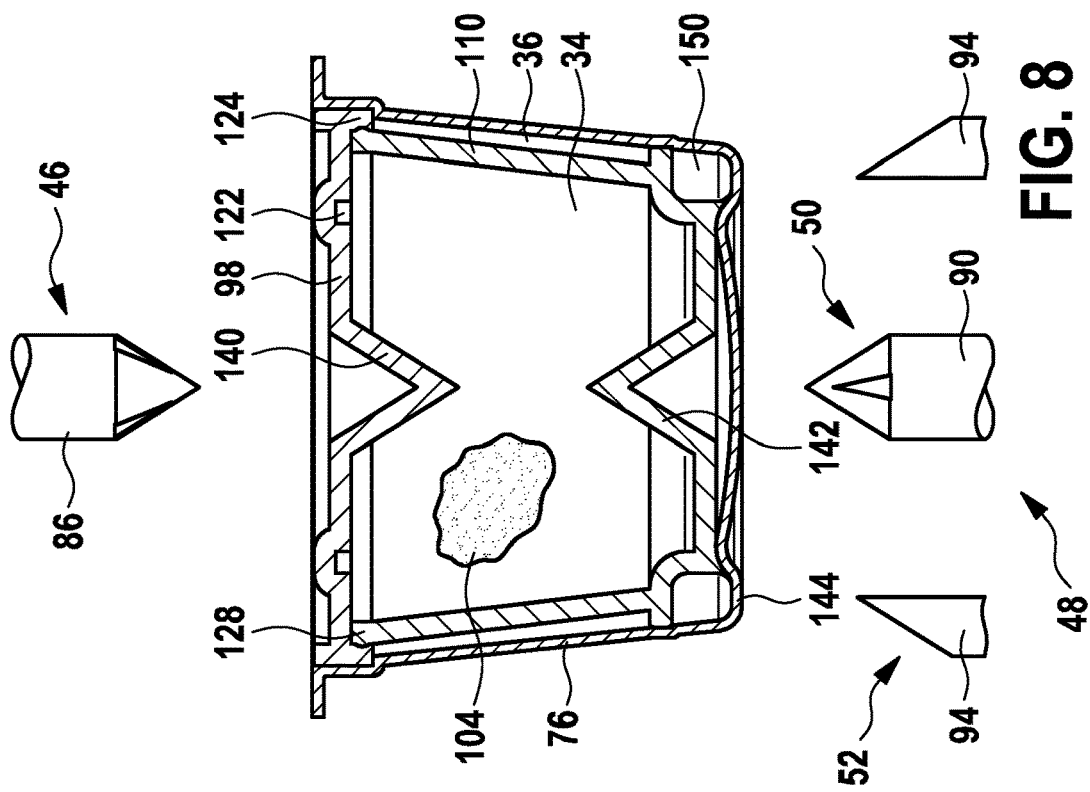

PROCESSING UNIT, SYSTEM COMRISING A CONSUMABLE AND USE OF A CONSUMABLE

This application is the U.S. National Phase application under 35 U.S.C. § 371 of International Application No. PCT/EP2015/079597, filed on Dec. 14, 2015, which claims the benefit of International Application No. 14199114.1 filed on Dec. 19, 2014. These applications are hereby incorporated by reference herein.

FIELD OF THE INVENTION

The present disclosure generally relates to the area of appliances (generally referred to as beverage dispensers or dispensers herein) that prepare a beverage via extraction of food substances through the passage of an extraction fluid, such as hot or cold water, under pressure. The food substance, such as coffee or tea, is contained in consumables that are inserted in these appliances. A beverage may thus generally be coffee, a coffee-based mixed drink, tea, soup, hot or cold chocolate, milk or baby food.

More particularly, the present disclosure relates to a processing unit for a dispenser that is adapted to and capable of processing the aforementioned consumables (also referred to as capsule or pod) that comprise a plurality of internal chambers that may serve different purposes. The present disclosure further relates to a foodstuff preparation system that comprises a processing unit and a consumable containing a least one food substance, and to a use of a respective consumable in a dispensing appliance.

BACKGROUND OF THE INVENTION

A beverage dispensing appliance is known from EP 2 543 291 A1. The document discloses a beverage production machine comprising a brewing head for the production of a beverage, the brewing head comprising a brewing chamber comprising at least two brewing chamber portions movable with respect to each other, a water heater, a hot water duct for feeding hot pressurized water in said brewing chamber from said water heater, a dispensing duct from which said beverage is dispensed, and a structural frame supporting said at least two brewing chamber portions, on which forces generated by the pressurized water in the brewing chamber during brewing are discharged, wherein said structural frame includes said water heater.

The consumables (also called single-serve units or disposable consumables) currently in use are basically of two types. One type of consumable is generally called a "capsule" and is basically a unit with rigid walls containing the food substance and that has two bases through which the extraction water passes. The capsules are placed into chambers defined by two bodies, one shaped to receive most of the capsule and a closing body which tightly seals the chamber. The water is introduced into the chamber and then traverses the capsule. Thanks to the rigid shape of the capsule, the hydraulic seals of the chamber allow the water to basically traverse the capsule without recirculating the extracted substance through the chamber.

A second type of consumable of a flat shape is generally called a "pod" (or "pad") and may consist of two sections made of thin soft material, cut and paired in order to define a cavity in which the food substance is placed. The material may be for example paper, or a cloth or a non-woven fabric with filtering properties. The two sections are generally circular and are coupled along their outer edges, defining an outer annular flange. The machines which use pods may have two half-shells which are sealed to define a chamber where the pod is placed. Specifically, the annular flange of the pod may be received between the opposite surfaces of the half-shells, defined outside the chamber. Generally, coffee-based pods may be regarded as pre-packaged ground coffee beans in their own filter.

WO 2014/057094 A1 discloses a food capsule comprising a cup-shaped capsule body enclosing a cavity, said capsule body comprising a first end and a second end, said first end comprising an opening communicating with said cavity and said second end comprising at least one outlet communicating with said cavity, an injection wall closing said opening of said first end of said capsule body, and at least one partition disposed within said cavity and dividing said cavity into a plurality of chambers. Consequently, so-called multi-chamber capsules are described. However, WO 2014/057094 A1 further teaches that a respective dispensing appliance (referred to as food preparation machine) preferably comprises a plurality of injection needles each of which is assigned to a respective chamber so as to pierce the chambers and to supply the chambers with hot pressurized water. Consequently, a brewing head (also referred to as processing unit herein) of such a dispensing appliance is rather costly and requires relatively complex control arrangements.

The present disclosure focuses on capsule-type consumables. There is a general need to further improve the flavor, quality and appearance of dispensed foodstuff products, particularly coffee-based or similar beverages. Furthermore, there is a general need to further increase the variety of foodstuff products that can be obtained from dispensing appliances that are capable of processing single-serve units.

SUMMARY OF THE INVENTION

It is an object of the present invention to provide an alternative approach to the preparation of foodstuff products, particularly beverages, that may be obtained from capsule-based consumables, particularly from consumables that comprise a plurality of distinct chambers. It is particularly desirable to provide a processing unit that is capable of processing so-called multi-chamber consumables so as to prepare non-standard foodstuff products such as mixed beverages that can be obtained from more than one component. Advantageously, the processing unit does not require complex control arrangements and can be produced in a cost-efficient way. Preferably, also respective consumables, systems comprising a processing unit and a consumable, and respective dispensing appliances are presented in the context of the present disclosure that may facilitate the preparation of foodstuff products that comprise a mixture of distinct components. Preferably, also a respective use of a consumable for preparation of foodstuff products in a processing unit is disclosed.

In a first aspect of the present disclosure, a processing unit for a dispenser for preparation of foodstuff products is presented, the processing unit comprising:

a receiving cavity for receiving a consumable, the receiving cavity comprising at least a first receiving portion and at least a first fastening portion, a sealing unit arranged to contact, at an inlet side, a first end of the consumable, such that an inlet portion of the consumable can be engaged in a basically pressure-tight manner, a primary inlet engagement unit that is coupled to an inlet conduit through which pressurized water can be supplied, wherein the primary inlet engagement unit is operable to engage the inlet portion of the consumable to process a foodstuff product in the consumable, an outlet engagement arrangement comprising:
- a primary outlet engagement unit that is operable to engage a primary outlet portion of the consumable at an outlet side thereof to enable the processed foodstuff product to flow out of the consumable, and
- at least one auxiliary outlet engagement unit that is operable to engage at least one auxiliary outlet portion of the consumable at the outlet side to enable the processed foodstuff product to flow out of the consumable, and
- a control unit that is coupled to the at least one auxiliary outlet engagement unit,
- wherein the control unit is operable to control the at least one auxiliary outlet engagement unit such that the primary outlet engagement unit and the at least one auxiliary outlet engagement unit engage the consumable in a time-displaced manner.

The above aspect is based on the insight that the processing unit can be set up for the preparation of non-standard foodstuff products in a cost efficient fashion by providing an enhanced outlet engagement arrangement that is basically operable to engage distinct outlet portions of the consumable at distinct time-instants. Consequently, the processing unit can be arranged to apply enhanced preparation procedures, such as mixing procedures and/or mixing regimes even though basically only one water inlet needs to be provided. Rather, several outlets of the consumable may be engaged so as to enhance the variety of foodstuff flavors that can be processed by the processing unit and obtained from the consumable. By way of example, non-standard mixed beverages can be prepared in this way, such as café americano, café au lait or caffè latte, for instance. The processing unit is particularly suited for processing consumables comprising two or more distinct chambers.

In some embodiments, different food substances may be contained in the respective chambers, e.g. coffee-based and milk-based. In some embodiments, at least one of the chambers may be arranged as bypass chamber which allows a process fluid to bypass another chamber, e.g. for the preparation of café americano. Consequently, an overall output flow that is discharged from the consumable may comprise a time-dependent or stage-dependent composition and can be controlled by the outlet engagement arrangement.

In some embodiments, the inlet side may also be referred to as high-pressure side, i.e. the side where a pressurized liquid can be supplied to the consumable. Consequently, the outlet side may be also referred to as low-pressure side, i.e. the side where the prepared foodstuff product flows out of the consumable and/or the processing unit and is subjected to basically ambient pressure. This may have the advantage that the outlet engagement arrangement may be coupled to the consumable at the low-pressure side which may avoid complex sealing arrangements. This may have the further advantage that the outlet engagement arrangement can be relatively easy to maintain and clean. Preferably, only a single (primary) inlet engagement unit is provided.

This is in clear contrast to the above-mentioned WO 2014/057094 A1 which proposes to provide respective multiple-piercer and multiple-inlet arrangements at the high-pressure (inlet) side of a capsule. Consequently, in accordance with the teaching of WO 2014/057094 A1 relatively costly sealing arrangements are required that are subjected to high-pressure conditions. This is all the more the case since the respective inlet piercers that are basically independent from each other further need to be separated and sealed from each other.

In accordance with the above-presented aspect of the present disclosure, a time-dependent actuation of the primary outlet engagement unit and the at least one auxiliary outlet engagement unit is proposed. Consequent, the primary outlet engagement unit and the at least one auxiliary outlet engagement unit may be operated and/or actuated in a basically time-staggered manner. In other words, the primary outlet engagement unit and the at least one auxiliary outlet engagement unit may be operated and/or actuated at different time instants. It is preferred that the actuation of the at least one auxiliary outlet engagement unit is delayed in time with respect to the actuation of the primary outlet engagement unit.

Generally, the control unit may be referred to as flow control unit. By way of example, the control unit may be operable to selectively actuate the at least one auxiliary outlet engagement unit. In some embodiments, the flow control unit may be manually operable. In some embodiments, the flow control unit may be electrically operable or electronically operable. In some embodiments, the flow control unit may be fluid operable. However, also an alternative flow control unit may be envisaged that is electrohydraulically operable.

At least in some embodiments, the primary outlet engagement unit may be actuated in a basically automatic manner without the need of explicit user activities. By way of example, a user of the dispenser may insert and lock a consumable in the receiving cavity of the processing unit and, at the same time, activate the primary outlet engagement unit by actuate one of the first receiving portion and the first fastening portion. In another exemplary embodiment, the primary outlet engagement unit may be activated when pressured fluid is led into the consumable and pressurizes the consumable according. Consequently, at least the primary outlet portion may be deformed (e.g. bulged) and brought into engagement with the primary outlet engagement unit.

According to one embodiment of the processing unit, the control unit is operable to activate the at least one auxiliary outlet engagement unit based on a defined time offset between the engagement of the primary outlet engagement unit and the at least one auxiliary outlet engagement unit.

Generally, the primary outlet portion may be activated and brought into engagement at a basically fixed time instant (in terms of the foodstuff preparation process). Hence, a time-offset may be applied before the at least one auxiliary outlet engagement unit is brought into engagement by the control unit. A duration of the time offset or time delay between the activation of the respective engagement units may be predefined (i.e. basically constant) and/or selectable in a case dependent manner.

According to another embodiment of the processing unit, the control unit comprises an actuator unit that is operable to displace the at least one auxiliary outlet engagement unit for engagement with the consumable. In one embodiment, the actuator unit is operable to displace the primary outlet engagement unit and the at least one auxiliary outlet engagement unit for time-displaced engagement with the consumable. In an alternative embodiment, the primary outlet engagement unit may be activated without being actuated by the control unit and/or the actuator unit. For instance, the primary outlet engagement unit may automatically engage (e.g., pierce) a to-be-processed consumable when the consumable is inserted in the receiving cavity which may involve arranging the consumable at the receiving portion and locking the receiving cavity.

According to still another embodiment of the processing unit, the control unit comprises a fluid-operated actuator unit, particularly a hydraulic cylinder. Preferably, the operator unit may be directly or mediately operated by the pressurized liquid that can be present in the dispensing appliance anyway. The pressurized liquid may be therefore pressurized water. Hence, the pressurized liquid may enter a chamber of the cylinder and operate a piston. The piston may be coupled to the at least one auxiliary outlet engagement unit.

According to yet another embodiment of the processing unit, the control unit comprises a control valve, particularly a flow control valve, lock valve or a directional valve, wherein an actuator flow conduit is provided through which a control fluid can be supplied via the control valve to the fluid-operated actuator unit. Preferably, the flow control valve is adjustable. By adjusting the throughput through the flow control valve the time-offset or time-delay between the actuation of the primary outlet engagement unit and the at least one auxiliary outlet engagement unit may be defined.

According to still another embodiment of the processing unit, the control unit comprises an electrically operated actuator unit, particularly a solenoid actuator or an electromotive actuator. Consequently, the actuator unit can be electrically controlled. For instance, the control unit may further comprise a timer. Consequently, the time offset between the actuation of the primary outlet engagement unit and the at least one auxiliary outlet engagement unit may be adjusted. Generally, the time offset or time delay may be triggered by a user control, e.g. when a user operates controls of the dispensing appliance to initiate processing of an inserted consumable in the processing unit.

According to still another embodiment of the processing unit, the control unit comprises a manually operable actuator unit. In accordance with this embodiment, the user may initiate the actuation of the actuator unit, trigger the time offset or even set a desired by operating respective controls at the dispensing appliance. By way of example, the manually operable actuator unit may be arranged as a spring-operated actuator unit which may be pre-tensioned when inserting the consumable and locking the receiving cavity. The pre-tensioned spring-operated actuator unit may be then released at a respective time instant to urge the at least one auxiliary outlet engagement unit into engagement with the consumable.

In another aspect of the present disclosure, a foodstuff preparation system is presented, the foodstuff preparation system comprising a processing unit in accordance with at least one embodiment as disclosed herein, and a consumable containing a least one food substance, the consumable comprising:
  a housing comprising at least one rigid wall portion that is impermeable to liquid,
  an inlet portion arranged to enable pressurized water flow into the housing, when the consumable is inserted in the processing unit,
  a primary outlet portion arranged to enable the processed foodstuff product to flow out of the housing,
  at least one auxiliary outlet portion arranged to enable an auxiliary fluid flow out of the housing,
  at least two distinct chambers arranged in the housing, wherein a first chamber of the at least two distinct chambers is coupled to the primary outlet portion, and wherein a second chamber of the at least two distinct chambers is coupled to the at least one auxiliary outlet portion.

Generally, the consumable may be referred to as capsule, particularly as disposable capsule. The consumable may be basically cup-shaped. The at least two distinct chambers may be referred to as compartments. At least two of the chambers may be interconnected for fluid communication and/or arranged to become interconnected in the course of the preparation of the foodstuff product. Consequently, the inlet portion may be capable of supplying the at least two distinct chambers with pressurized water. Hence, the inlet portion may be directly coupled to one chamber of the at least two chambers. In some embodiments, the inlet portion may be mediately coupled to another chamber of the at least two chambers.

By way of example, the chambers may be interconnected via at least one internal hole or passage. The at least one internal hole or passage may be already present at the beginning of the foodstuff preparation process. In the alternative, the hole may be processed (e.g. ruptured) in the course of the foodstuff preparation process. In another alternative embodiment, the (external) housing of the consumable, or an internal housing, may be deformed when a chamber that is connected to the inlet portion is pressurized. The deformation of a component of the consumable may activate or release the internal passage to connect the two chambers. By way of example, a fastening wall or cover may be at least sectionally "lifted" in the vicinity of a junction of the fastening wall and the internal housing when the first chamber is filled with pressurized liquid.

Generally, the at least two chambers may be arranged in a basically concentric manner. Hence, a first chamber may be arranged in a basically cylindrical fashion. A second chamber may be arranged in a basically tubular fashion and encircle the first chamber. Consequently, at the first end and the second end, the first chamber may comprise a basically circular cross-section and the second chamber may comprise a basically annular cross-section. Also the outlet engagement arrangement may be arranged in accordance with the general layout of the at least two chambers. Hence, the primary outlet engagement unit may be assigned to a central portion of the second end of the consumable that corresponds to the circular cross-section. The at least one auxiliary engagement unit may be assigned to a peripheral portion of the consumable that corresponds to the annular cross-section. In one embodiment, the auxiliary engagement unit may be arranged in a basically annular fashion.

Preferably, the chambers are initially enclosed in the sealed housing in a sealed manner. Hence, the consumable may be sealed which may prolong the "shelf life" of the consumable. Further, the consumable may comprise a first inlet portion arranged to be ruptured by a water inlet piercing arrangement. The primary outlet portion may be arranged to be ruptured by a primary outlet piercing unit. The auxiliary outlet portion may be arranged to be ruptured by an auxiliary outlet piercing unit. Generally, the respective piercing unit(s) may be referred to as engagement unit(s).

At least one of the primary inlet engagement unit, the primary outlet engagement unit and the auxiliary outlet engagement unit may be arranged as a piercing unit. Consequently, at least in some embodiments, respective primary inlet piercing units, primary outlet piercing units and/or auxiliary outlet piercing units may be provided that may rupture the consumable to access the respective chambers.

However, in the alternative, at least one of the transfer portions (primary inlet portion, primary outlet portion and/or auxiliary outlet portion) of the consumable may be engaged and/or connected without an actuable piercing unit. In some embodiments, at least one transfer portion may comprise a manually releasable seal. Hence, a respective opening seal may be manually released by a user before the consumable is inserted in the processing unit and eventually processed and consumed. In some embodiments, at least one transfer portion may comprise a meltable or fusible material that can be fluidized and removed by applying a hot fluid thereto, particularly hot water and/or a hot foodstuff product. In some embodiments, at least one transfer portion may be arranged to cooperate with a basically fixed piercing element of the processing unit when the consumable swells in the course of being supplied with hot pressurized water. In some embodiments, at least one transfer portion may comprise a weakened portion, particularly a thinned portion, that may be ruptured when the consumable is pressurized by applying a pressurized liquid thereto in the course of preparing the foodstuff product.

According to one embodiment of the foodstuff preparation system, the inlet portion is arranged at an inlet side of the consumable, wherein the primary outlet portion and the at least one auxiliary outlet portion are arranged at an outlet side of the consumable. As indicated above, the inlet side may be referred to as high-pressure side and requires pressure-tight sealing in the receiving cavity. The outlet side may be referred to as low-pressure side and basically does not require pressure-tight sealing.

According to another embodiment of the foodstuff preparation system, the at least two chambers comprise at least one containing chamber and at least one auxiliary chamber, the containing chamber containing a food substance. The food substance may be at least partially water-soluble. The food substance may be a ground substance, such as ground coffee, or a powdered substance, such as milk powder. The containing chamber may be also referred to as primary containing chamber.

According to still another embodiment of the foodstuff preparation system, the auxiliary chamber forms a water flow bypass that bypasses the containing chamber. Hence, upon being activated by the at least one auxiliary engagement unit, a water flow or at least a flow of a water solution containing small proportions of food substances may be caused. In this way, for instance, caffè americano-like beverages may be processed. Cattè americano style coffee basically requires to prepare an espresso style coffee and to add hot water to the semi-finished espresso style beverage. Hence, the flow of the espresso style coffee may be actuated by engaging or piercing the primary outlet portion. Delayed in time, the flow of the second component may actuated by engaging or piercing the auxiliary outlet portion.

According to yet another embodiment of the foodstuff preparation system, the auxiliary chamber contains a food substance, preferably a food substance that is different from the food substance provided in the containing chamber. By way of example, the (primary) containing chamber may comprise a coffee based substance and the auxiliary chamber may comprise a milk or milk powder based substance. Generally, the auxiliary chamber may comprise a food substance that enriches the flavor of the to-be-processed foodstuff product. However, in the alternative, both the (primary) containing chamber and the auxiliary chamber may also comprise basically the same food substance, e.g. when the consumable is an extra strong coffee type consumable.

According to another embodiment of the foodstuff preparation system, each chamber of the at least two chambers is coupled to the outlet side for fluid communication, particularly for fluid discharge or dispense when the respective chamber is engaged or pierced by the outlet engagement arrangement.

According to another embodiment of the foodstuff preparation system, the at least two chambers comprise at least one internal passage to enable an auxiliary fluid flow, particularly an internal fluid flow from the first chamber to the second chamber. In some embodiments, the at least one internal passage may be selectively activated.

In yet another aspect of the present disclosure, a dispensing appliance for preparation of foodstuff products, particularly a beverage dispenser, is presented, the dispensing appliance comprising:
  a water tank,
  a pump unit for pressurizing water supplied from the water tank,
  a heating unit for heating pressurized water, and
  a processing unit in accordance with at least one embodiment as disclosed herein.

Preferably, the dispensing appliance is arranged to process consumables in accordance with at least some embodiments described herein. Needless to say, the dispensing appliance may be arranged to prepare different types of foodstuff products that can be obtained from different types of consumables. Hence, the dispensing appliance may be arranged to process conventional single-chamber capsules as well. The heating unit may be arranged as a flow-through heater, a boiler or a similar heating device. Further, the dispensing appliance may be basically configured to process pre-heated water conducted thereto from an external heating unit. Basically, the heating unit may be arranged downstream of the pump unit. In the alternative, the pump unit may be arranged downstream of the heating unit.

In still another aspect of the present disclosure a use of a consumable in a dispensing appliance for preparation of foodstuff products is presented, the dispensing appliance comprising a processing unit in accordance with at least one embodiment as disclosed herein, the consumable comprising:
  a housing comprising at least one rigid wall portion that is impermeable to liquid,
  an inlet portion arranged to enable pressurized water flow into the housing, when the consumable is inserted in the processing unit,
  a primary outlet portion arranged to enable the processed foodstuff product to flow out of the housing,
  an auxiliary outlet portion arranged to enable an auxiliary fluid flow out of the housing,
  at least two distinct chambers arranged in the housing, wherein a first chamber of the at least two distinct chambers is coupled to the primary outlet portion, and wherein a second chamber of the at least two distinct chambers is coupled to the auxiliary outlet portion.

At least two consumables may define a set of consumables comprising at least two consumables for use in a beverage dispenser for preparation of a beverage. It is preferred that at least one of the consumables is formed in accordance with at least some aspects of the present disclosure.

BRIEF DESCRIPTION OF THE DRAWINGS

These and other aspects of the invention will be apparent from and elucidated with reference to the embodiments described hereinafter. In the following drawings FIG. 8 shows a cross-sectional side view of an embodiment of a consumable in accordance with an embodiment shown in FIG. 7, FIG. 9 shows another cross-sectional side view of a consumable in accordance with an embodiment shown in FIG. 7, the consumable being arranged in a receiving cavity.

DETAILED DESCRIPTION OF THE INVENTION

Figure 1:
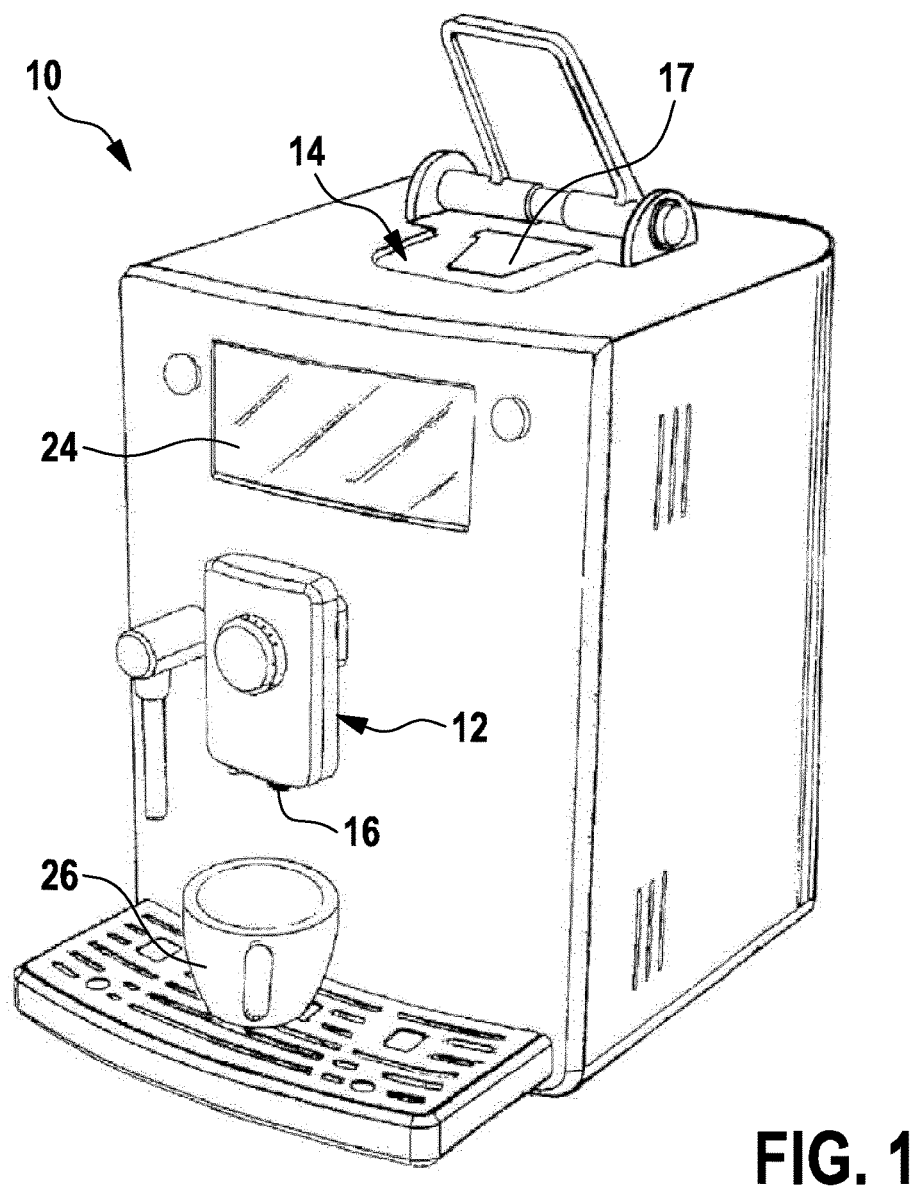
FIG. 1 shows a perspective view of an embodiment of a beverage dispenser, particularly a coffee making appliance.

FIG. 1 shows a perspective view of a dispenser 10, which may be also referred to as coffee making appliance hereinafter. The dispenser 10 may generally, together with consumables 30 (refer also to FIG. 2), form a beverage preparation system. Typically, the dispenser 10 uses capsules as consumables 30. Capsule-based consumables 30 may be referred to as rigid consumables 30 and have the major advantage over soft pad based consumables that they can seal a foodstuff product and its flavor for a considerably long time. In some embodiments the beverage dispenser 10 is configured to be used for making other beverages than coffee, e.g. tea, hot or cold milk, soup, baby food, etc. Further, the consumables 30 generally contain a corresponding food substance for the preparation of the respective beverage by use of the beverage dispenser.

With respect to an exemplary embodiment of the dispenser 10, particular reference is made to EP 2 543 291 A1. Further reference in this respect is made to WO 2011/077349 A2.

The dispenser 10 may comprise a dispensing head 12 from which a processed product, particularly a processed beverage, may be obtained. The dispensing head 12 may comprise an outlet portion 16 including an outlet duct to fill a container or cup 26 with the foodstuff product. The dispenser 10 may further comprise a processing unit 14 which will be described further below in more detail. The processing unit 14 may be configured to receive and process consumables 30, particularly capsules containing food substances, such as ground coffee-based products. By way of example, the processing unit 14 may comprise a receiving cavity 17 that may comprise a receiving portion 18 and a fastening portion 20 for receiving and sealing a to-be-processed consumable 30, refer also to FIG. 3. Furthermore, user controls 24 may be provided that may comprise a display, a touchscreen, switches, control buttons, etc.

Figure 2:
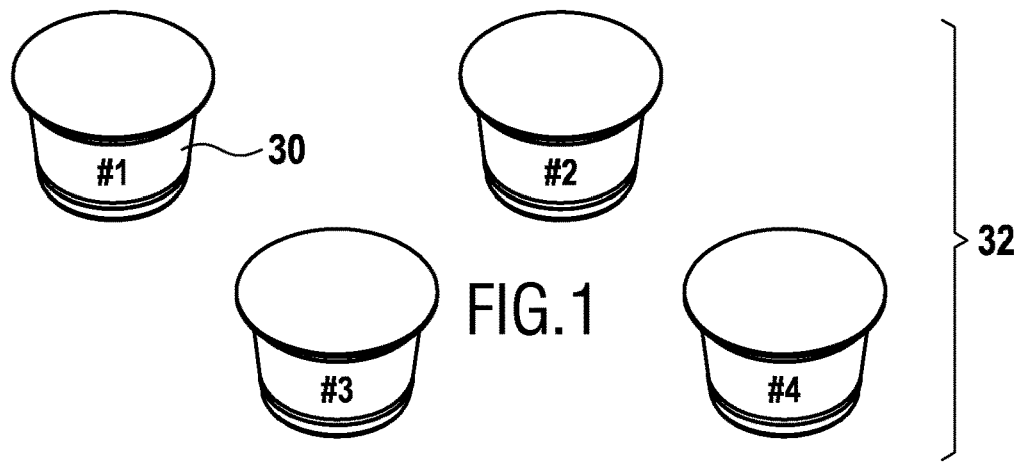
FIG. 2 shows an illustrative perspective top view a set of consumables, particularly capsules, which can be used in dispensing appliances.

FIG. 2 is a perspective top view of an exemplary set 32 of capsules 30. The set 32 of capsules 30 may comprise at least two consumables 30. By way of example, the set 32 of capsules 30 may comprise a plurality of consumables 30 of the same type of flavor. Further, the set 32 of capsules 30 may comprise a plurality of consumables 30 at least some of which represent different types and/or flavors.

Figure 3:
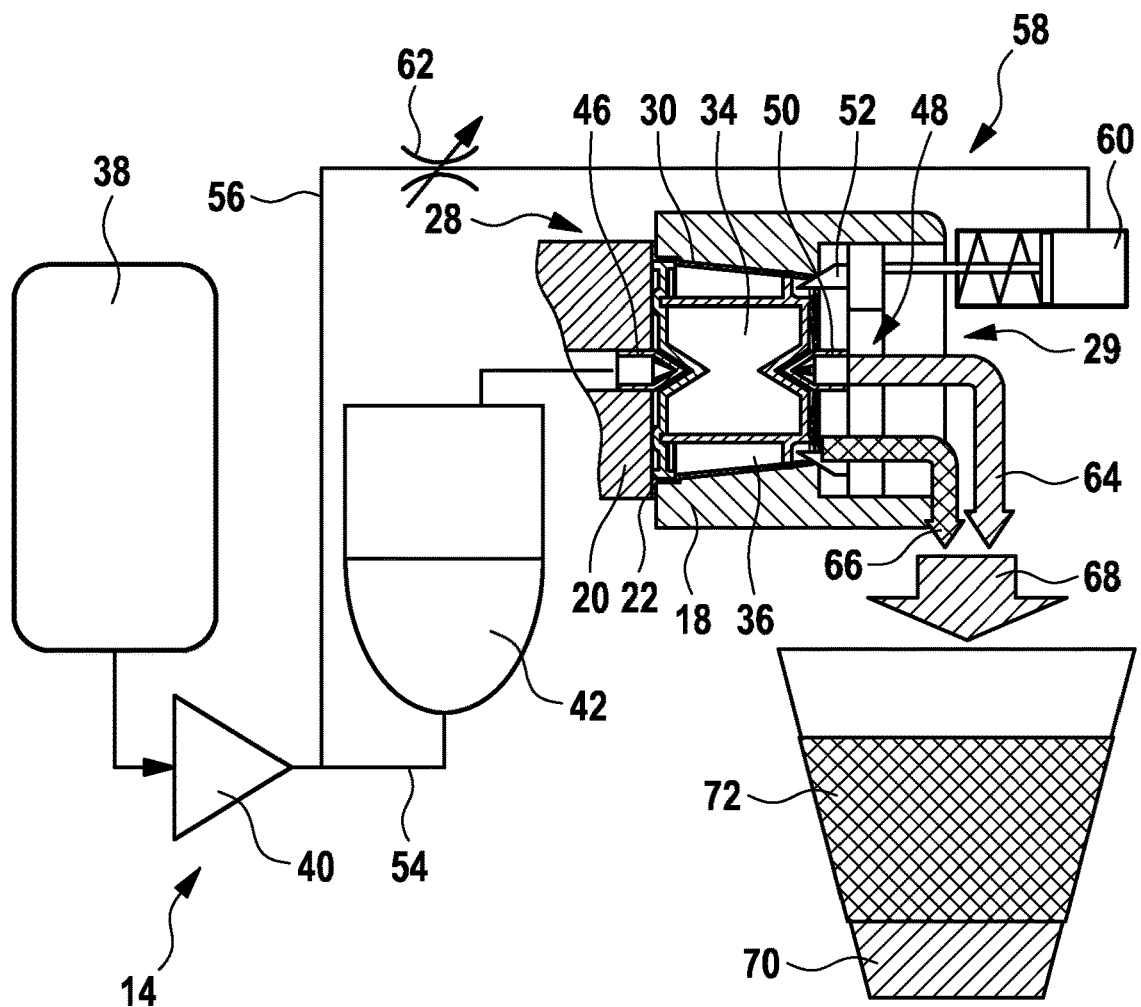
FIG. 3 shows a simplified schematic illustrative block representation of an exemplary embodiment of a processing unit, particularly a brewing unit, for a dispenser.
Figure 5:
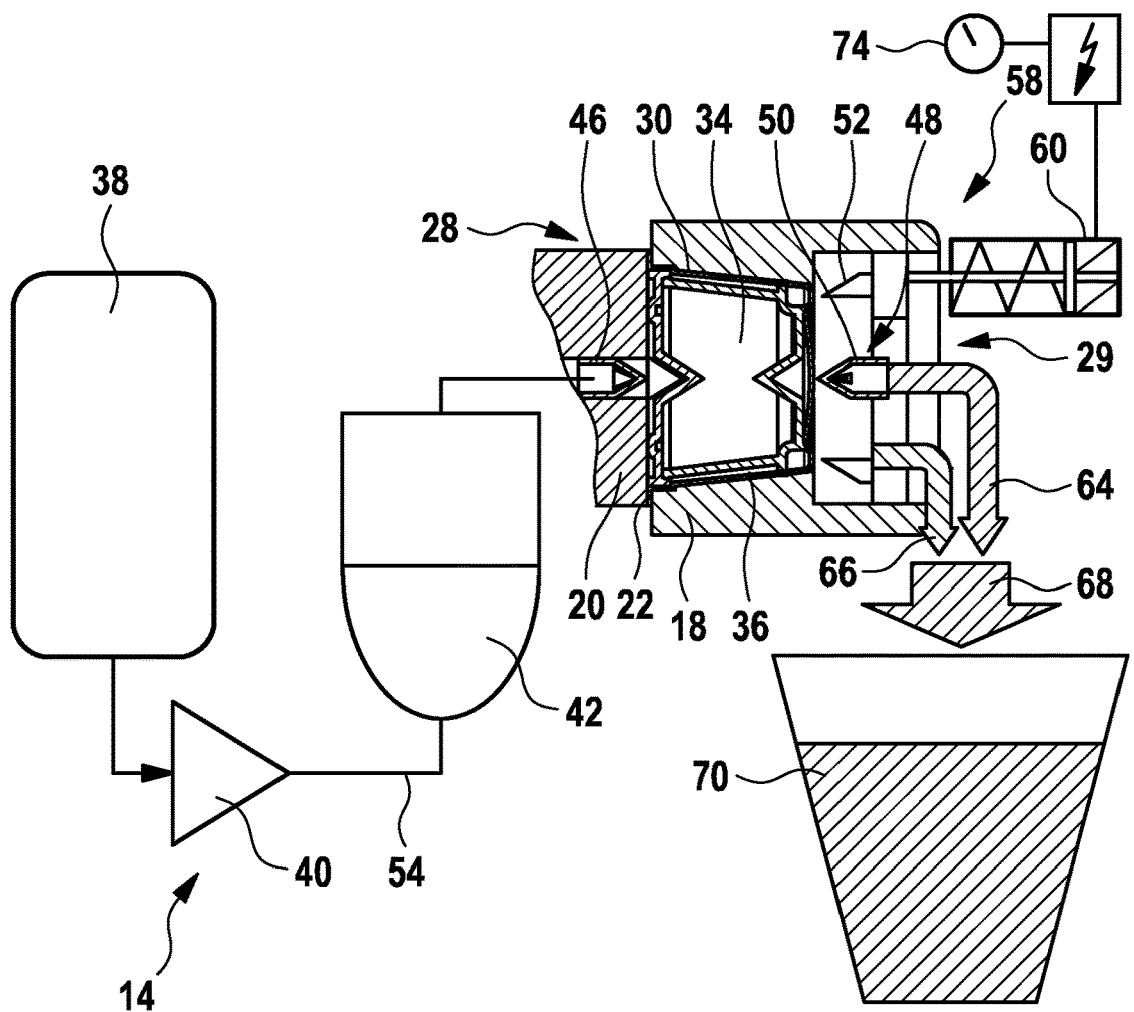
FIG. 5 shows a simplified schematic illustrative block representation of another exemplary embodiment of a processing unit, particularly a brewing unit, for a dispenser.

With particular reference to FIGS. 3 and 5, exemplary embodiments of a processing unit 14 for a dispenser 10 are illustrated and further described. Generally, the processing unit 14 may be arranged to obtain a beverage or similar foodstuff product 70 (e.g. coffee, milk, etc.) from a to-be-processed consumable 30. It may be desired to prepare a great variety of different foodstuff products 70, e.g. foodstuff products 70 that comprise tasteful crema layers and/or milk layers 72. To this end, in accordance with the present disclosure, so-called multi-chamber consumables 30 may be utilized. A multi-chamber consumable 30 may comprise more than one distinct internal chamber 34, 36. By way of example, the exemplary consumable 30 illustrated in FIGS. 3 and 5 may comprise a first chamber 34 and a second chamber 36. The first chamber 34 may contain a food substance 104 and the second chamber may contain a food substance 106, refer also to FIG. 9. From the food substances 104, 106, the foodstuff product 70 may be obtained upon treatment with hot pressurized water. In accordance with the embodiment illustrated in FIGS. 5 and 8, the second chamber 36 may be regarded as bypass chamber which may provide a bypass passage for water that may bypass the first chamber in the course of the foodstuff product 70 preparation process.

The consumable 30 may be received at a receiving cavity 17 comprising a receiving portion 18 which cooperates with a fastening portion 20 so as to receive the consumable 30 in a sealed manner. To this end, a sealing unit 22 comprising at least one seal may be provided. The sealing unit may seal an inlet side 28 (also referred to as high-pressure side herein) in a basically pressure tight manner. Preferably, at least in some embodiments, there is no need to seal an outlet side 29 (also referred to as low-pressure side herein) in a similar pressure-tight manner. Consequently, pressurized water may be supplied to the inlet side 28 of the consumable 30 and leave the consumable 30 at the outlet side 29 which is basically subjected to ambient pressure.

The processing unit 14 may comprise a water tank 38 and a pump 40 to pressurize water obtained from the water tank 38. Further, a boiler or heater 42 may be provided to heat up the water. The processing unit 14 may further comprise a primary inlet piercing unit 46 and an outlet piercing arrangement 48 that are arranged to engage respective portions. The outlet piercing arrangement 48 may comprise a primary outlet piercing unit 50 and an auxiliary outlet piercing unit 52 that are arranged to engage respective portions at the outlet side 29. The primary outlet piercing unit 50 and the auxiliary outlet piercing unit 52 may be basically operable in a manner independently of each other. Particularly, the primary outlet piercing unit 50 and the auxiliary outlet piercing unit 52 may engage or pierce the consumable 30 at different time instants in a time-displaced manner.

At least one of the primary inlet piercing unit 46 and the primary outlet piercing unit 50 may be arranged to engage its counterpart portion of the consumable 30 when the receiving portion 18 and the fastening portion 20 are brought into engagement when the consumable 30 is inserted and locked in the receiving cavity 17.

Preferably, at least one of the primary inlet piercing unit 46 and the primary outlet piercing unit 50 are coupled with the fastening portion 20 and the receiving portion 18, respectively. However, at least in some embodiments at least one the primary inlet piercing unit 46, the primary outlet piercing unit 50 and the auxiliary outlet piercing unit 52 may be actuable independently of the fastening portion 20 and the receiving portion 18. To this end, the primary inlet piercing unit 46, the primary outlet piercing unit 50 and the auxiliary outlet piercing unit 52 may be coupled with respective actuators.

By way of example, as shown in FIGS. 3 and 5, the auxiliary outlet piercing unit 52 may be actuable independently of the fastening portion 20 and the receiving portion 18. The auxiliary outlet piercing unit 52 may be coupled to an actuator unit 60. Preferably, the actuator unit 60 can be controlled by a control unit 58. As can be further seen in FIGS. 3 and 5, the actuator unit 60 may be basically operable to displace the auxiliary outlet piercing unit 52 or, more particularly, to urge the auxiliary outlet piercing unit 52 into engagement with the consumable 30. Generally, the actuator unit 60 can be an electrically operated actuator unit 60 (e.g. electric drive, electromagnet, etc.), a mechanically operated actuator unit 60 (e.g., spring operated), and/or a fluid operated actuator unit 60 (e.g., hydraulic drive).

FIG. 3 describes an embodiment in which the actuator unit 60 may comprise a hydraulic cylinder that may be coupled to the pressurized fluid system of the processing unit 14. An actuator fluid flow 56 may be established to actuate the actuator 60 and, consequently, the secondary inlet piercing unit 50. The actuator flow 56 may pass a control unit 58 that comprises a control valve 62 to control the auxiliary outlet piercing unit 52. The control unit 58 preferably comprises a flow control valve 62 that delays the actuation of the actuator unit 60 and, consequently, of the auxiliary outlet piercing unit 52.

FIG. 5 describes an embodiment in which the actuator unit 60 comprises an electrically operated actor, particularly a solenoid actuator. Consequently, the control unit 58 may be operable to block and/or release the solenoid-type actuator. In other words, the control unit 58 may selectively power the actuator unit 60. Furthermore, the control unit 58 may be coupled to a time circuit or timer 74. The timer 74 may basically set a desired time offset for the operation of the actuator unit 60 and/or trigger the operation of the actuator unit 60.

Further, a main inlet flow 54 may be established to supply hot pressurized water via the primary inlet piercing unit 46 to the received consumable 30. The processed foodstuff product 70 may flow out via respective outlets pierced by the primary outlet piercing unit 50 and/or the auxiliary outlet piercing unit 52, refer to output flow components 64, 66 that form the overall output flow 68. Generally, the output flow may comprises a primary (or: main) component 64 and an auxiliary component 66. The primary output flow component 64 may be enabled during basically the whole foodstuff product preparation procedure. The auxiliary output flow component 66 may be activated at a later time instant in the course of the foodstuff product preparation procedure.

As can be seen from FIG. 3, the output flow 68 may at least partially comprise a mixed layer, e.g. a crema layer and/or a milk layer 72 that tops the foodstuff product 70. As can be seen from FIG. 5, in some embodiments, the prepared foodstuff product 70 may be a basically homogeneous mixture or a basically homogeneous solution. This can be achieved, for instance, when both chambers 34, 36 comprise the same food substance 104, 106 and/or when the second chamber 36 is arranged as a bypass chamber through which a water bypass flow can be established.

Figure 4:
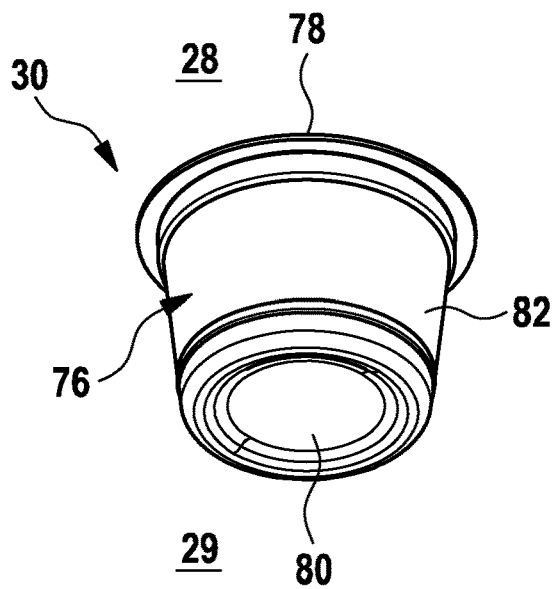
FIG. 4 shows a simplified perspective bottom view of an embodiment of a consumable in accordance with the present disclosure.
Figure 6:
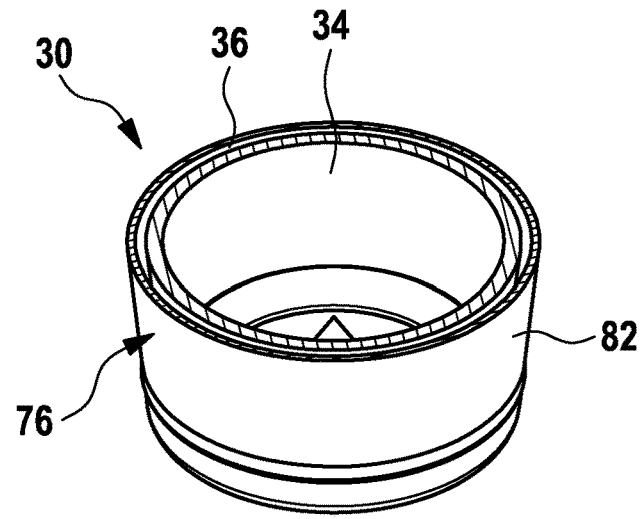
FIG. 6 shows a perspective cross-sectional bottom view of an embodiment of a consumable in accordance with the present disclosure.

Reference is made to FIG. 4 illustrating a perspective bottom view of a capsule-type consumable 30. Further reference is made to FIG. 6 illustrating a respective cross-sectional view. As can be seen from FIGS. 4 and 6, the consumable 30 may comprise a housing 76, particularly a relatively rigid housing 76 at least partially comprising plastic walls and/or aluminum walls that are impermeable to liquid or, more generally, at least substantially impermeable to fluids. At least in some embodiments, the housing 76 may be referred to as sealed housing, particularly as initially sealed housing that is sealed before being processed in the dispenser 10. For the purpose of this disclosure, the consumable 30 may comprise a first end 78 and a second end 80 that is opposite to the first end 78. Between the first end 78 and the second end 80, a rigid wall portion 82 may be provided. Generally, the first end 78 may be associated with the inlet side 28. Consequently, the second end 80 may be associated with the outlet side 29.

As used herein, the term "top" shall refer to the first end 78 of the consumables 30 for illustrative purposes. Further, the term "bottom" shall refer to the second end 80 of the consumables 30 for illustrative purposes. However, this assignment shall be not interpreted in a limiting sense. This is all the more the case since in some dispensers 10 consumables 30 can be received in a particular orientation wherein the first end 78 and the second end 80 of the consumable 30 is not necessarily aligned with the top of the dispenser 10 and the bottom, respectively.

In the consumable 30, the first chamber 34 and the second chamber 36 may be provided that may be arranged in a basically concentric fashion. The first chamber 34 may occupy a major portion of the consumable 30 and may be therefore referred to as primary chamber. The second chamber 36 may occupy a minor portion of the consumable 30 and may be therefore referred to as auxiliary chamber. The first chamber 34 may have a basically circular cross-section. The second chamber 36 may have a basically annular cross-section.

Figure 7:
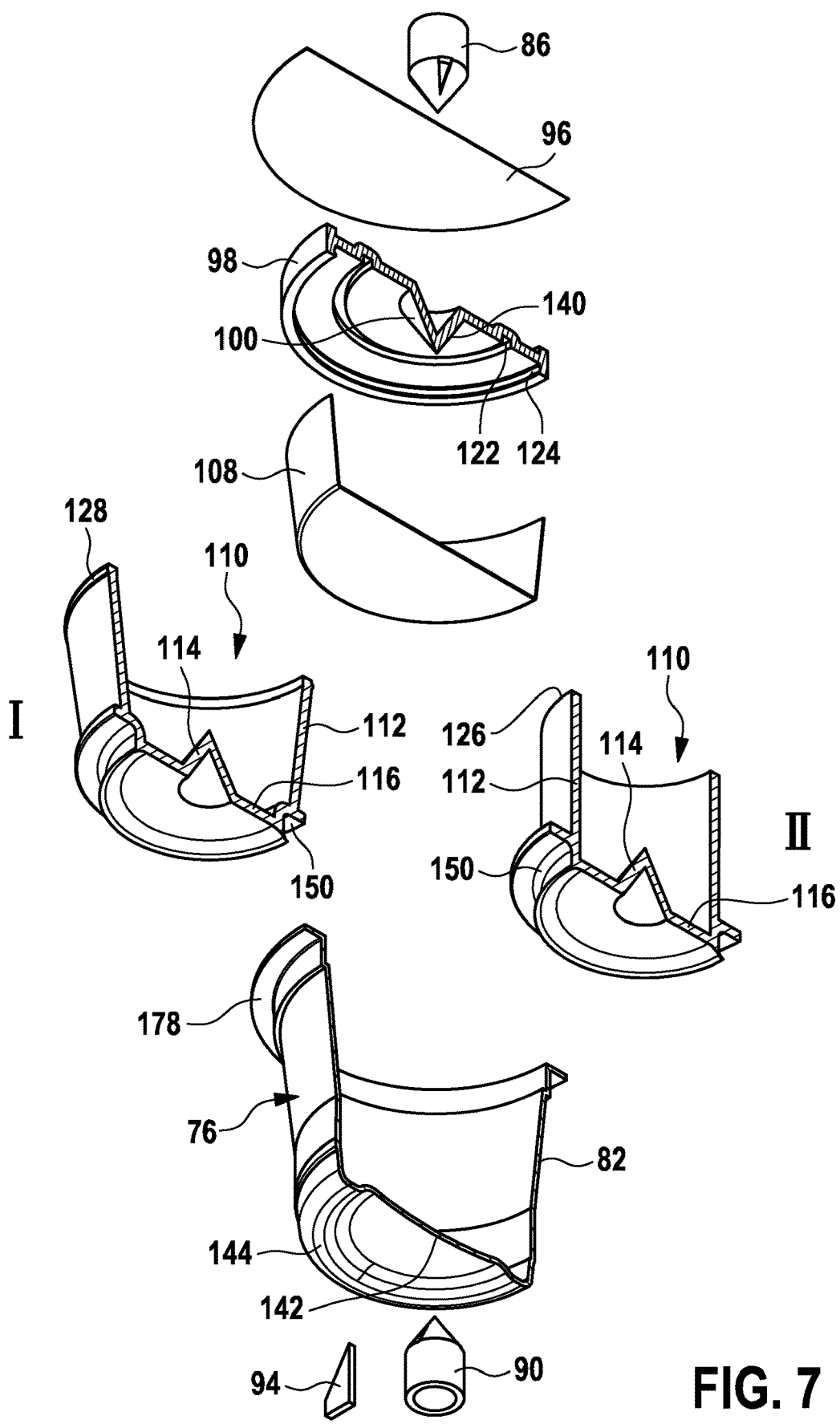
FIG. 7 shows a perspective exploded cross-sectional bottom view of two embodiments of a consumable in accordance with the present disclosure.

Further reference is made to FIGS. 7 to 9. FIG. 7 illustrates several embodiments of the consumable 30, particularly two embodiments of an internal housing 110 of the consumable 30 that basically separates the first chamber 34 and the second chamber 36. In FIG. 7, a first embodiment of the internal housing 110 is indicated by reference sign I, refer also to FIG. 8. A second embodiment of the internal housing 110 is indicated by II, refer also to FIG. 9. The remaining components of the consumable 30 may basically correspond to each other. Consequently, variants of the consumable 30 may be formed in a relatively cost-efficient manner.

FIG. 7 is a perspective cross-sectional exploded view of the consumable 30. FIGS. 8 and 9 show enlarged cross-sectional views of the consumable 30. For illustrative purposes, the primary inlet piercing unit 46, the primary outlet piercing unit 50 and the auxiliary outlet piercing unit 52 are schematically indicated in FIGS. 7, 8 and 9.

Generally, the primary inlet piercing unit 46 may comprise at least one primary inlet piercer 86 or an arrangement of primary inlet piercers 86. Similarly, the primary outlet piercing unit 50 may comprise at least one primary outlet piercer 90 or an arrangement of primary outlet piercers 90. Similarly, the auxiliary outlet piercing unit 52 may comprise at least one auxiliary outlet piercer 94 or an arrangement of auxiliary outlet piercers 94. The primary inlet piercing unit 46, the primary outlet piercing unit 50 and the auxiliary outlet piercing unit 52 may be arranged at a processing unit 14 of the dispenser 10.

The at least one primary inlet piercer 86 may comprise at least one duct or conduit 88 to enable a fluid flow, particularly a flow of pressurized heated water into the consumable 30, refer also to FIG. 9. The at least one primary outlet piercer 90 may comprise at least one duct or conduit 92 to enable a fluid flow, particularly a foodstuff product flow out of the consumable 30, refer also to FIG. 9. The at least one auxiliary outlet piercer 94 may be arranged in a similar fashion.

The consumable 30 comprises a housing 76 that may enclose an inner process or containing volume in a sealed manner. At a first end 78 of the housing 76, a lid or cover 96 may be provided. The first end 78 may cover a top wall or fastening wall 98 of the housing 76. At the fastening wall 98, a conical recess or recess 100 may be provided which may be adapted to the primary inlet piercer 86. Adjacent to the fastening wall 98, the chambers 34, 36 may be provided that may be adapted to contain a food substance 104, 106. The food substance 104, 106 may be at least partially retained in a filter or filter web 108. As can be seen from FIG. 7, the filter or filter web 108 may comprise a bowl-like shape. However, the filter or filter web 108 may also entirely enclose the food substance 104, 106.

As indicated above, the internal housing 110 may be provided in the (exterior) housing 76 to define (or: separate) a plurality of distinct chambers 34, 36 of the consumable 30. Also the internal housing 110 may be shaped in a basically cup-like fashion. The internal housing 110 may comprise an inner boundary wall or inner wall portion 112 that may extend in a basically tubular manner. In other words, the inner wall portion 112 may comprise an annular cross-section. The inner wall portion 112 may encircle the first chamber 34. Furthermore, the internal housing 110 may comprise an end wall 116 that is arranged adjacent to the second end 80. Adjacent to the first end 78, the internal housing 110 may comprise an opening that may be covered by the fastening wall 98. A recess or boss 114 may be provided in the end wall 116 that may be arranged to cooperate with the primary outlet piercer 90. At a transition between the inner wall portion 112 and the end wall 116, a peripheral slot or recess may be provided that may define a peripheral channel 150 when the internal housing 110 is arranged in the housing 76. As can be best seen from FIGS. 8 and 9, the internal housing 110 and the (exterior) housing 76 may jointly define the second chamber 36 which may comprise a basically annular cross-section (refer also to FIG. 6) and encircle the first chamber 34.

As can be best seen from FIG. 7, several variants of the consumable 30 may be present. Indicated by reference signs I and II, two alternative embodiments of the internal housing 110 (hereinafter referred to as internal housing 110-I and internal housing 110-II) can be provided. The internal housing 110-I comprises an inner wall portion 112 that is arranged as a basically conical or tapered tube. The internal housing 110-II comprises an inner wall portion 112 that is arranged as a basically cylindrical tube. The first chamber 34 defined by the internal housing 110-I (refer also to FIG. 9) is significantly smaller in volume than the first chamber 34 defined by the internal housing 110-I (refer also to FIG. 8).

By contrast, the second chamber 36 defined by the internal housing 110-I (refer also to FIG. 9) is significantly greater in volume than the second chamber 36 defined by the internal housing 110-I (refer also to FIG. 8).

Preferably, both the internal housing 110-I and the internal housing 110-II may be arranged to cooperate with similar of basically the same common components of the consumables 30. Consequently, variants of the consumables 30 can be formed in a cost-efficient manner. It is further preferred that both the internal housing 110-I and the internal housing 110-II are arranged to be coupled to a single-type fastening wall 98. To this end, the fastening wall 98 and the internal housings 110-I, 110-II may comprise respective mating portions that enable for couple both internal housings 110-I, 110-II to the fastening wall 98. By way of example, the fastening wall 98 may comprise an annular groove 122 and a peripheral receiving edge 124. The internal housing 110-II may comprise a mating edge 126 arranged at an end of the inner wall portion 112 that is configured to engage the annular groove 122 of the fastening wall 98, refer to FIG. 9. The internal housing 110-I may comprise a mating edge 128 arranged at an end of the inner wall portion 112 that is configured to engage the peripheral receiving edge 124 of the fastening wall 98, refer to FIG. 9.

For interaction with the primary inlet piercing unit 46, the primary outlet piercing unit 50 and the auxiliary outlet piercing unit 52, the consumable 30 may comprise respective engagement portions which can be ruptured by respective piercers. At the first end 78, at least one primary inlet portion 140 may be provided. The at least one primary inlet piercer 86 may engage (or: rupture) the primary inlet portion 140. At the second end 80 of the housing 76 at least one primary outlet portion 142 may be provided that can be associated with the first chamber 34. The at least one outlet piercer 90 may engage (or: rupture) the primary outlet portion 142. Further, at least one auxiliary outlet portion 144 may be provided at the housing 76 of the consumable 30 that may be associated with the second chamber 36. The at least one auxiliary outlet piercer 94 may engage (or: rupture) the auxiliary outlet portion 144. By way of example, the auxiliary outlet portion 144 may be provided at a peripheral zone of the second end 80.

The auxiliary outlet portion 144 may be coupled to a peripheral channel 150. Basically, the peripheral channel 150 may be jointly formed by the (exterior) housing 76 and the internal housing 110. The peripheral channel 150 may be shaped an as indentation or recess at the internal housing 110 that is covered by the housing 76. When the at least one auxiliary outlet piercer 94 of the auxiliary outlet piercing unit 50 penetrates or ruptures the auxiliary outlet portion 144, an auxiliary flow may be established that contributes to the formation to-be-processed foodstuff product 70, refer also to FIGS. 10 to 12.

By way of example, the auxiliary outlet engagement unit 52 may comprise respective auxiliary outlet piercers or blades 94 that are primarily arranged to engage the auxiliary outlet portion 144 to enable an outlet flow. Hence, the auxiliary outlet piercers or blades 94 do not necessarily have to provide (internal) conduits. Rather, a respective outlet flow may flow past the auxiliary outlet piercers 94 that are basically solid, refer also to FIG. 8. However, in some embodiments, the auxiliary outlet piercers 94 may comprise at least one internal outlet flow channel or conduit, refer also to FIG. 9.

As can be further seen from FIG. 9, at the high-pressure side or inlet side 28, a sealing unit 22 may engage and bias a peripheral edge 178 or the housing 76 that is received at the receiving portion 18 in a basically pressure-tight manner. Consequently, also the inlet portion 140 is sealed in a basically pressure-tight manner. To this end, the receiving portion 18 and the fastening portion 20 may be brought into engagement when the consumable 30 is received in the receiving cavity 17 of the processing unit 14. Hence, pressurized water may be supplied to the consumable 30 via the inlet portion 140. Further, at least the first chamber 34, preferably the first chamber 34 and the second chamber 36, may be pressurized accordingly. At the low-pressure side or outlet side 29, there is basically no need to seal any of the outlet portions 142, 144 in a pressure-tight manner.

Figure 12:
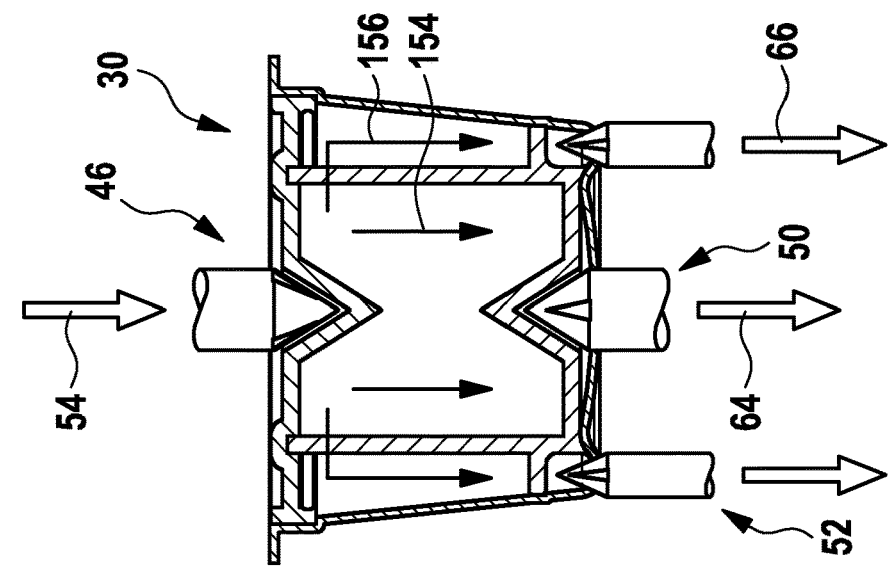
FIG. 12 shows still another view of the arrangement of FIGS. 10 and 11, the engagement units being shown in a third engagement state.
Figure 11:
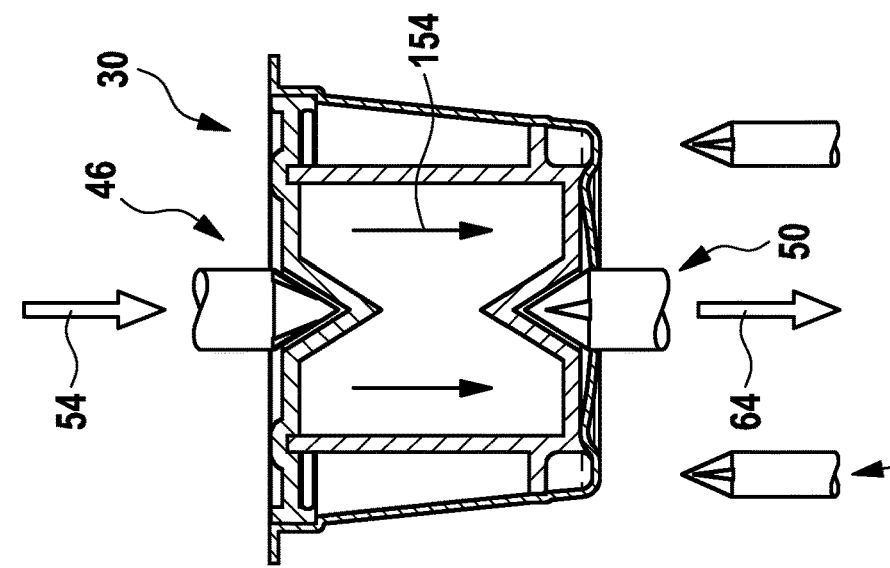
FIG. 11 shows another view of the arrangement of FIG. 10, the engagement units being shown in a second engagement state.
Figure 10:
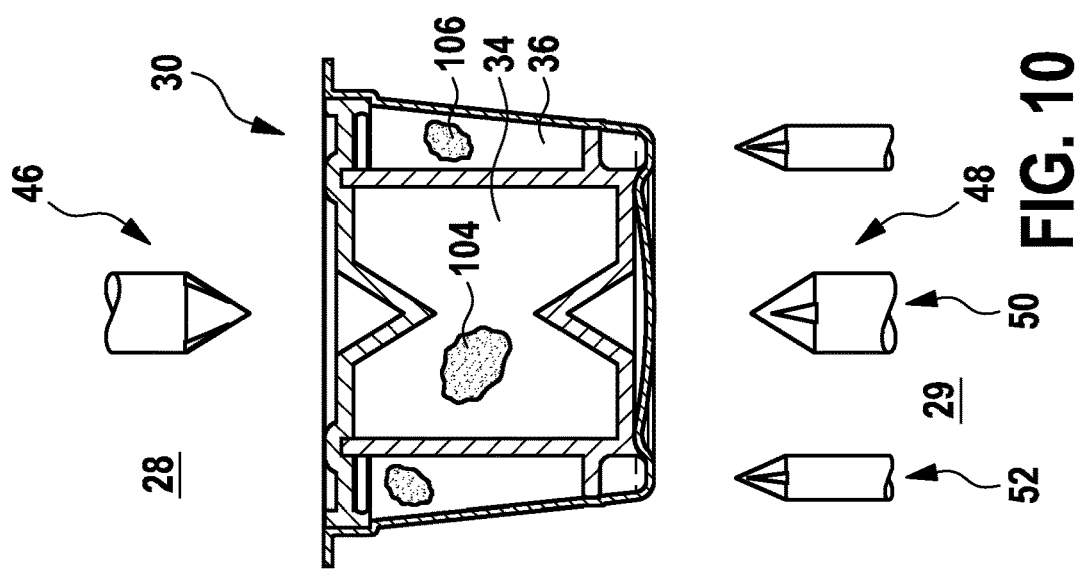
FIG. 10 shows a simplified cross-sectional side view of an embodiments of a consumable and engagement units in accordance with the present disclosure, the engagement units being shown in a first engagement state.

Further reference is made to FIGS. 10 to 12 which illustrate in a schematic manner distinct stages of a foodstuff product preparation procedure. FIGS. 10 to 12 are based on the embodiment shown in FIG. 8 which, however, shall not be understood in a limiting sense. FIG. 10 illustrates a first stage, wherein neither the primary inlet engagement unit 46 nor the outlet engagement arrangement 48 engages (or: pierces/ruptures) the consumable 30. Consequently, neither the primary outlet engagement unit 50 nor the auxiliary engagement unit 52 engages the consumable 30. Neither an input flow nor an output flow can be established.

FIG. 11 illustrates a second stage, wherein the primary inlet engagement unit 46 engages the consumable 30. Further, the primary outlet engagement unit 50 of the outlet engagement arrangement 48 engages the consumable 30. The primary inlet engagement unit 46 and the primary outlet engagement unit 50 may be brought into engagement with the consumable 30 in a basically simultaneous manner. However, in some embodiments, the engagement of the primary inlet engagement unit 46 may basically precede or even trigger the engagement of the primary outlet engagement unit 50. In the second state, an input flow 54 into the consumable 30 is enabled. Further, a primary output flow 62 is enabled. Consequently, pressurized water can enter the first chamber 34, react with the food substance 104 contained therein, and exit the consumable 30, refer also to FIG. 10. In the first chamber 34 a main fluid throughput 154 may be established. In the second stage, there is basically no substantial interaction between the pressurized water and the second chamber 36 that leads to an (auxiliary) output flow.

FIG. 12 illustrates a third stage, wherein the primary inlet engagement unit 46 and the primary outlet engagement unit 50 (still) engage the consumable 30. Furthermore, also the auxiliary engagement unit 52 is brought into engagement with the consumable 30. Hence, the auxiliary engagement unit 52 engages the consumable 30 at a later stage of the foodstuff product preparation procedure. By way of example, a time offset between the initiation of the second stage (FIG. 11) and the third stage (FIG. 12) may take several seconds, e.g. 5 seconds, 10 seconds or 15 seconds, for instance. By way of example, the foodstuff product preparation procedure may take 20 to 40 seconds in total. Hence, the second stage may be initiated at an early phase of the procedure. The third stage may be initiated at an advanced phase or even a late phase of the procedure.

As can be further seen from FIG. 12, the engagement of the auxiliary engagement unit 52 activates an auxiliary output flow 66 which may contribute to the preparation of the foodstuff product. Furthermore, also the second chamber 36 is activated in the third stage. As indicated by reference numeral 156 in FIG. 12, an auxiliary fluid throughput may be established. Pressurized water may pass the second chamber 36 and leave the consumable 30 to form the auxiliary output flow 66. In case a food substance 106 is provided in the second chamber 36, the pressurized water may react with the food substance 104 contained therein. The primary output flow 64 and the auxiliary output flow 66 may form an overall output flow.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A processing unit for a dispenser for preparation of foodstuff products, the processing unit comprising:
  a receiving cavity for receiving a consumable, the receiving cavity comprising at least a first receiving portion and at least a first fastening portion,
  a sealing unit arranged to contact, at an inlet side, a first end of the consumable, such that an inlet portion of the consumable can be engaged in a pressure-tight manner,
  a primary inlet engagement unit that is coupled to an inlet conduit through which pressurized water can be supplied, wherein the primary inlet engagement unit is operable to engage the inlet portion of the consumable to process a foodstuff product in the consumable,
  an outlet engagement arrangement comprising:
    a primary outlet engagement unit that is operable to engage a primary outlet portion of the consumable at an outlet side thereof to enable the processed foodstuff product to flow out of the consumable, and
    at least one auxiliary outlet engagement unit that is operable to engage at least one auxiliary outlet portion of the consumable at the outlet side to enable the processed foodstuff product to flow out of the consumable, and
  a control unit that is coupled to the at least one auxiliary outlet engagement unit,
  wherein the control unit is operable to control the at least one auxiliary outlet engagement unit such that the primary outlet engagement unit and the at least one auxiliary outlet engagement unit engage the consumable in a time-displaced manner.

2. The processing unit as claimed in claim 1, wherein the control unit is operable to activate the at least one auxiliary outlet engagement unit based on a defined time offset between the engagement of the primary outlet engagement unit and the at least one auxiliary outlet engagement unit.

3. The processing unit as claimed in claim 1, wherein the control unit comprises an actuator unit that is operable to displace the at least one auxiliary outlet engagement unit for engagement with the consumable, and wherein the actuator unit is preferably operable to displace the primary outlet engagement unit and the at least one auxiliary outlet engagement unit for the time-displaced engagement with the consumable.

4. The processing unit as claimed in claim 3, wherein the control unit comprises a fluid-operated actuator unit, particularly a hydraulic cylinder.

5. The processing unit as claimed in claim 4, wherein the control unit further comprises a control valve, particularly a flow control valve, lock valve or a directional valve, and wherein an actuator flow conduit is provided through which a control fluid can be supplied via the control valve to the fluid-operated actuator unit.

6. The processing unit as claimed in claim 3, wherein the control unit comprises an electrically operated actuator unit, particularly a solenoid actuator or an electromotive actuator.

7. The processing unit as claimed in claim 3, wherein the control unit comprises a manually operable actuator unit.

8. A foodstuff preparation system comprising a processing unit as claimed in claim 1 and a consumable containing a least one food substance, the consumable comprising:
- a housing comprising at least one rigid wall portion that is impermeable to liquid,
- an inlet portion arranged to enable pressurized water flow into the housing, when the consumable is inserted in the processing unit,
- a primary outlet portion arranged to enable processed food substance to flow out of the housing,
- at least one auxiliary outlet portion arranged to enable an auxiliary fluid flow out of the housing,
- at least two distinct chambers arranged in the housing, wherein a first chamber of the at least two distinct chambers is coupled to the primary outlet portion, and wherein a second chamber of the at least two distinct chambers is coupled to the at least one auxiliary outlet portion.

9. The foodstuff preparation system as claimed in claim 8, wherein the inlet portion is arranged at an inlet side of the consumable, and wherein the primary outlet portion and the at least one auxiliary outlet portion are arranged at an outlet side of the consumable.

10. The foodstuff preparation system as claimed in claim 8, wherein the at least two distinct chambers comprise at least one containing chamber and at least one auxiliary chamber, the containing chamber containing a food substance, particularly a ground substance.

11. The foodstuff preparation system as claimed in claim 10, wherein the at least one auxiliary chamber forms a water flow bypass that bypasses the containing chamber.

12. The foodstuff preparation system as claimed in claim 10, wherein the at least one auxiliary chamber contains a food substance, preferably a food substance that is different from the food substance provided in the containing chamber.

13. The foodstuff preparation system as claimed in claim 8, wherein each chamber of the at least two distinct chambers is coupled to the outlet side for fluid communication.

14. A dispensing appliance for preparation of foodstuff products, particularly a beverage dispenser, the dispensing appliance comprising:
- a water tank,
- a pump unit for pressurizing water supplied from the water tank,
- a heating unit for heating the pressurized water, and
- a processing unit as claimed in claim 1.

15. A use of a consumable in a dispensing appliance for preparation of foodstuff products, the dispensing appliance comprising a processing unit as claimed in claim 1, the consumable comprising:
- a housing comprising at least one rigid wall portion that is impermeable to liquid,
- an inlet portion arranged to enable pressurized water flow into the housing, when the consumable is inserted in the processing unit,
- a primary outlet portion arranged to enable processed foodstuff product to flow out of the housing,
- an auxiliary outlet portion arranged to enable an auxiliary fluid flow out of the housing,
- at least two distinct chambers arranged in the housing, wherein a first chamber of the at least two distinct chambers is coupled to the primary outlet portion, and wherein a second chamber of the at least two distinct chambers is coupled to the auxiliary outlet portion.

* * * * *

UNITED STATES PATENT AND TRADEMARK OFFICE
CERTIFICATE OF CORRECTION

PATENT NO. : 10,610,044 B2
APPLICATION NO. : 15/529576
DATED : April 7, 2020
INVENTOR(S) : Holten et al.

Page 1 of 1

It is certified that error appears in the above-identified patent and that said Letters Patent is hereby corrected as shown below:

On the Title Page

In Item (54), in Title, in Column 1, Line 1, delete "COMRISING" and insert -- COMPRISING --, therefor.

On Page 2, in Item (57), under "ABSTRACT", in Column 1, Line 23, delete "manner, The" and insert -- manner. The --, therefor.

In the Specification

In Column 1, Line 1, delete "COMRISING" and insert -- COMPRISING --, therefor.

In Column 7, Line 45, delete "Cattè americano" and insert -- Caffè americano --, therefor.

In Column 7, Line 50, delete "may actuated" and insert -- may be actuated --, therefor.

In Column 9, Line 3, delete "view a" and insert -- view of a --, therefor.

In Column 15, Line 35, delete "primary output flow 62" and insert -- primary output flow 64 --, therefor.

Signed and Sealed this
Seventeenth Day of November, 2020

Andrei Iancu
*Director of the United States Patent and Trademark Office*